United States Patent [19]
Sherer et al.

[11] Patent Number: 6,026,095
[45] Date of Patent: Feb. 15, 2000

[54] METHOD AND APPARATUS FOR CONTROLLING LATENCY AND JITTER IN SHARED CSMA/CD (REPEATER) ENVIRONMENT

[75] Inventors: William Paul Sherer, Danville; Wen-Tsung Tang, Saratoga; Ismail Dalgic, Mountain View; Peter Wang, Cupertino, all of Calif.

[73] Assignee: 3Com Corporation, Santa Clara, Calif.

[21] Appl. No.: 08/865,226

[22] Filed: May 29, 1997

Related U.S. Application Data

[63] Continuation-in-part of application No. 08/733,358, Oct. 17, 1996, abandoned, which is a continuation of application No. 08/313,674, Sep. 27, 1994, Pat. No. 5,568,469.
[60] Provisional application No. 60/032,124, Dec. 5, 1996.

[51] Int. Cl.[7] .................................................. H04L 12/413
[52] U.S. Cl. ............................................ 370/448; 370/401
[58] Field of Search ..................................... 370/229, 230, 370/235, 242, 243, 245, 400, 401, 445, 447, 448, 462, 461; 395/280, 287, 289, 293, 297, 299

[56] References Cited

U.S. PATENT DOCUMENTS

| | | | |
|---|---|---|---|
| 4,412,326 | 10/1983 | Limb | 370/448 |
| 5,436,903 | 7/1995 | Yang et al. | 370/448 |
| 5,699,515 | 12/1997 | Berkema et al. | 370/448 |
| 5,754,799 | 5/1998 | Hiles | 370/447 |
| 5,771,235 | 6/1998 | Tang et al. | 370/448 |

*Primary Examiner*—Ricky Q. Ngo
*Attorney, Agent, or Firm*—Townsend and Townsend and Crew; Kenneth R. Allen

[57] ABSTRACT

An improved computer network and network device uses characteristics of prior art shared network protocols to control the flow of data and access to the network among a group of transmitting nodes. The invention determines which nodes wish to send data when a collision occurs by detecting and recording which nodes participated in a collision. A scheduling routine is designed to give each connected node a chance to send. A transmission control mechanism is used to prevent a subset of transmitters from transmitting while allowing one ES to transmit without experiencing a collision. The invention has a number of applications including within an improved ethernet repeater in a multimedia ethernet.

22 Claims, 18 Drawing Sheets

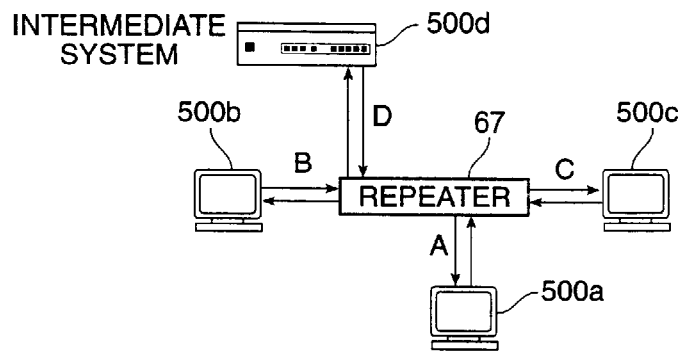
FIG. 2
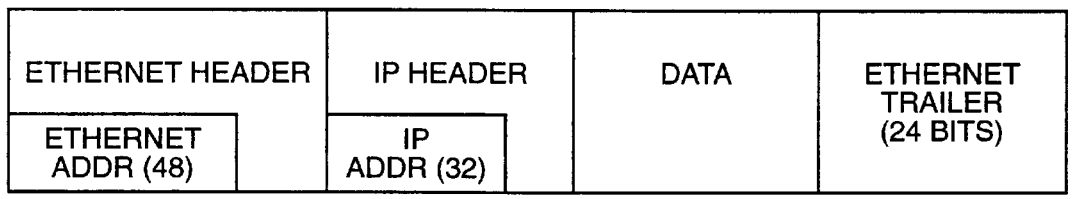
FIG. 3
| | LAYER NAME (NUMBER) | DEVICES | DATA | PROTOCOLS |
|---|---|---|---|---|
| HIGH | HIGHER LAYER PROTOCOLS | | | |
| | APPLICATION LAYER (5) | | FILES | FTP, HTTP |
| | TRANSPORT LAYER (4) | ROUTERS | ROUTING PACKETS | TCP, UDP |
| | ROUTING LAYER (3) | ROUTERS | ROUTING PACKETS | IP |
| | DATA LINK LAYER (2) | BRIDGES | PACKETS | ETHERNET |
| LOW | PHYSICAL LAYER (0,1) | REPEATERS | BITS | ETHERNET |
FIG. 4

FIRST-COME-FIRST-SERVED (REPEATER SELECTS A)

P = PREAMBLE
D = PACKET DATA
J = JAM
I = INTER-PACKET GAP

METHOD AND APPARATUS FOR CONTROLLING LATENCY AND JITTER IN SHARED CSMA/CD (REPEATER) ENVIRONMENT

This application is a continuation-in-part from patent application Ser. No. 08/733,358, filed Oct. 17, 1996, now abandoned, which is a continuation of U.S. Ser. No. 08/313,674, now U.S. Pat. No. 5,568,469, filed Sep. 27, 1994 and issued Oct. 22, 1996.

This application claims priority from provisional patent application Ser. No. 60/032,124, filed Dec. 5, 1996.

BACKGROUND OF THE INVENTION

Improvements to related network technology are described in co-assigned patent applications, Ser. No. 08/641,619, filed May 1, 1996, entitled Scalable CSMA/CD Repeater; and another filed May 16, 1997 (application no. not yet received), entitled Symmetrical Flow Control for Gigabit Ethernet Full Duplex Buffer Repeater.

The current invention relates to the field of electronic circuits. More particularly, the current invention relates to improvements in networked computer environments and has particular applications to the transmission of information between digital devices over a communications medium. A very wide variety of types of computer systems and networks exist, each having variations in particular implementations. The present invention will be described with reference to particular types of systems for clarity but this should not be taken to limit the invention, and it will be apparent to those of skill in the art that the invention has applications in many different types of computer systems. The invention therefore should not be seen as limited except as specifically herein provided.

Digital computer networks have become ubiquitous in academic, industry, and office environments. A number of different aspects of computer networks are discussed in co-assigned pending U.S. applications Ser. Nos. 08/313,674; 08/542,157; 08/506,533; and 08/329,714 each of which are incorporated herein by reference to the extent necessary to understand the invention.

Networking Devices Standards

This specification presumes familiarity with the general concepts, protocols, and devices currently used in LAN networking and WAN internetworking applications such as, for example, the IEEE 802 and ISO 8802 protocol suites and other series of documents released by the Internet Engineering Task Force that are publicly available and discussed in more detail in the above-referenced patent applications and will not be fully discussed here.

FIG. 1

FIG. 1 illustrates a local area network (LAN) 40 of a type that might be used today in a moderate-sized office or academic environment and as an example for discussion purposes of one type of network in which the present invention may be effectively employed. LANs are arrangements of various hardware and software elements that operate together to allow a number of digital devices to exchange data within the LAN and also may include internet connections to external wide area networks (WANs) such as WANs 82 and 84. Typical modern LANs such as 40 are comprised of one to many LAN intermediate systems (Iss) such as ISs 60–62 and 67 that are responsible for data transmission throughout the LAN and a number of end systems (ESs) such as ESs 50*a–d*, 51*a–c*, and 52*a–g*, that represent the end user equipment. The ESs may be familiar end-user data processing equipment such as personal computers, workstations, and printers and additionally may be digital devices such as digital telephones or real-time video displays. Different types of ESs can operate together on the same LAN. In one type of LAN, LAN ISs 60–61 are referred to as bridges and WAN ISs 64 and 66 are referred to as routers, and IS 67 is referred to as a repeater, however many different LAN configurations are possible, and the invention is not limited in application to the network shown in FIG. 1.

The LAN shown in FIG. 1 has segments 70*a–e*, 71*a–e*, and 72*a–e*, and 73*a*. A segment is generally a single interconnected medium, such as a length of contiguous wire, optical fiber, or coaxial cable or a particular frequency band. A segment may connect just two devices, such as segment 70*a*, or a segment such as 72*d* may connect a number of devices using a carrier sense multiple access/collision detect (CSMA/CD) protocol or other multiple access protocol such as a token bus or token ring. A signal transmitted on a single segment, such as 72*d*, is simultaneously heard by all of the ESs and ISs connected to that segment.

LANs also may contain a number of repeaters, such as repeater 67. A repeater generally physically repeats out of each of its ports all data received on any one port, such that the network behavior perceived by ESs 50*a–c* and the port of IS 60 connected to 67 is identical to the behavior these ports would perceive if they were wired on the same segment such as 52*d–g* and the corresponding port of 62. Repeaters configured in a star topology, such as 67, are also referred to as hub repeaters. (The term hub is a term used in networking that sometimes indicates either a switch/bridge layer 2 device or a repeater layer 1 device depending on the context.)

The term node is often used in describing networks to indicate any transmitter or receiver in the network. Repeater 67, for example, is a network intermediate system connected to four nodes, three of those being end systems and one being a different intermediate system bridge 60.

Packets

In a LAN such as 40, data is generally transmitted between ESs as independent packets, with each packet containing a header having at least a destination address specifying an ultimate destination and generally also having a source address and other transmission information such as transmission priority. ESs generally listen continuously to the destination addresses of all packets that are transmitted on their segments, but only fully receive a packet when its destination address matches the ES's address and when the ES is interested in receiving the information contained in that packet.

FIG. 2 depicts a packet as it may be transmitted to or from router 64 on LAN segment 73*a* as an example of a data unit with which the invention may be employed. Many other types of data units are possible. The packet shown is essentially an Ethernet packet, having an Ethernet header 202 and a 48-bit Ethernet address (such as 00:85:8C:13:AA) 204, and an Ethernet trailer 230. Within the Ethernet packet 200 is contained, or encapsulated, an IP packet, represented by IP header 212, containing a 32 bit IP address 214 (such as 199.22.120.33). Packet 200 contains a data payload 220 which holds the data the user is interested in receiving or holds a control message used for configuring the network.

Drivers, Adaptors, and LAN Topology

Each of the ISs and ESs in FIG. 1 includes one or more adaptors and hardware or software instructions sometimes referred to as drivers. An adaptor generally includes circuitry and connectors for communication over a segment and translates data from the digital form used by the computer circuitry in the IS or ES into a form that may be transmitted over the segment, e.g., electrical signals, optical signals, radio waves, etc. An ES such as 50b will generally have one adaptor for connecting to its single segment. A LAN IS such as 61 will have five adaptors, one for each segment to which it is connected. A driver is a set of instructions resident on a device that allows the device to accomplish various tasks as defined by different network protocols. Drivers are generally software programs stored on the ISs or ESs in a manner that allows the drivers to be modified without modifying the IS or ES hardware.

LANs may vary in the topology of the interconnections among devices. In the context of a communication network, the term "topology" refers to the way in which the stations attached to the network are interconnected. Common topologies for LANs are bus, tree, ring, and star. LANs may also have a hybrid topology made up of a mixture of these. The overall LAN pictured in FIG. 1 has essentially a tree topology, but incorporating one segment, 72d, having a bus topology, and incorporating one segment 70d having a star topology. A ring topology is not shown in FIG. 1, but it will be understood that the present invention may be used in conjunction with LANs having a ring topology.

Network Intermediate Systems: Routers, Bridges, Repeaters

The LAN ISs in LAN 40 include bridges 60–63. Bridges are understood in the art to be a type of computer optimized for very fast data communication between two or more segments. A bridge according to the prior art generally makes no changes to the packets it receives on one segment before transmitting them on another segment. Bridges are not necessary for operation of a LAN and, in fact, in prior art systems bridges are generally invisible to the ESs to which they are connected and sometimes to other bridges and routers.

LANs also may contain a number of repeaters, which is one configuration possible for device 67. A repeater generally repeats out of each of its ports all data received on any one port, such that the network behavior perceived by ESs such as 50d–f is generally identical to the behavior they would perceive if they were wired on the same segment such as 52d–g. In alternative network topologies, device 67 could be a bridge/switch/hub as described in related patent applications.

Layers

An additional background concept important to understanding network communications is the concept of layered network protocols. Modern communication standards, such as the TCP/IP Suite and the IEEE 802 standards, organize the tasks necessary for data communication into layers. At different layers, data is viewed and organized differently, different protocols are followed, and different physical devices handle the data traffic as abstracted at that layer. FIG. 3 illustrates one example of a layered network standard having a number of layers, which we will refer to herein as the Physical Layer, the Data Link Layer, the Routing Layer, the Transport Layer and the Application Layer. These layers correspond roughly to the layers as defined within the TCP/IP Suite. (The 802 standard has a different organizational structure for the layers and uses somewhat different names and numbering conventions.)

An important ideal in layered standards is the ideal of layer independence. A layered protocol suite specifies standard interfaces between layers such that, in theory, a device and protocol operating at one layer can coexist with any number of different protocols operating at higher or lower layers, so long as the standard interfaces between layers are followed.

Increasing Network Traffic Creates a Need For New Solutions

In recent years, the amount of data users wish to transmit over a network has increased dramatically. This increase has placed an increasingly heavy burdens on all parts of the network including on host system resources to service the various networking functions performed by the adaptor and to send and received data to and from the adaptor and on the capacity of various ISs in the network and various network connections. A number of existing networks include a mixture of components or segments, some capable of operating at a maximal speed of the network and others operating at slower speeds.

Coassigned patent U.S. Pat. No. 5,568,469 describes methods for controlling latency and jitter in a point-to-point ethernet connection is a switch. In the present invention, latency and jitter are controlled and throughput is increased in a shared ethernet device, such as repeater 67.

Prior Art Ethernet Backoff and Deferral

As is known in the art, prior art ethernet, going back to the earliest ethernet design, relies on occurrence and detection of collisions between multiple devices on the same physical segment in order to control access to the network by multiple devices.

In many modern ethernet standards, such as 10BaseT, physical collisions between multiple ESs do not actually occur, because often the ES each have their own physical connection to a switch or to a repeater, as is true for most of the ESs shown in FIG. 1. In these networks, collisions are either forced or simulated digitally by a controller in a switch or a repeater when more than one attached ES attempts to transmit at the same time.

In the case of most prior art devices thought of as repeaters, such as 67, signals received on any receive port are automatically transmitted out of all other transmit ports without regard by the repeater for whether any collision is caused thereby. ESs are expected to detect and recover from all collisions in accordance with their ES adaptor protocols.

While collisions are a necessary part of ethernet traffic control, they can be undesirable because after each collision, an ES experiencing collision will follow the ethernet protocol and enter backoff. In backoff, the ES initiates a counter with a random value and the ES will not attempt to transmit again until its backoff counter elapses. Once the backoff counter elapses, the ES will sample the transmission channel to determine if any data is being transmitted, and if data is being transmitted the ES will defer attempting a retransmit until the ES detects that the transmission channel is silent.

When a deferring ES detects that an ongoing transmission on its network has ended, the deferring ES will generally immediately begin to transmit. If another collision occurs during this attempted transmission, the ES will again enter a random backoff, but of roughly double the duration of the first backoff. In prior art ethernet, the backoff interval doubles on each succeeding collision. After some number of successive collisions on a particular packet, the packet is discarded (dropped) at the adaptor layer, and a message is sent to the higher layer protocol that the packet did not get through.

In other words, according to standard ethernet, an ES immediately after its backoff counter has elapsed will wait (defer) until a current packet is completely transmitted without colliding with that one packet, but the deferring ES will then either successfully transmit its packet or collide with the next packet transmitted by another ES.

It is well understood that prior art ethernet is effective and simple to implement when a channel is not operating near maximum capacity and there is a threshold of silent time on the channel. However, when the amount of data that a number of different transmitters wish to transmit approaches the network's capacity, prior art ethernet can become very inefficient, with many transmitters losing time in backoff and packets getting dropped, even when the channel is not loaded at maximum capacity.

Barriers to Controlling Collisions in a Shared CSMA/CD Environment

When a repeater such as 67 is connecting four devices that in total are transmitting near the maximum carrying capacity of the channel, it would be desirable to reduce collisions as much as possible. However, doing this within the confines of a shared ethernet environment is problematic. In the shared ethernet environment with end systems operating according to a standard ethernet protocol, there is no way provided for end systems to signal to a repeater such as 67 that they wish to transmit prior to beginning transmission, and there is no way provided for a repeater such as 67 to control the transmissions of end systems so that some end systems may be prevented from transmitting while other end systems are scheduled to transmit. Finally, a repeater such as 67 attempting to reduce collisions would have to schedule transmissions fairly among all end systems that wish to transmit so that the end systems experienced behavior on the shared channel that was compatible to what would be expected in standard ethernet.

What is needed is a method and apparatus in a shared ethernet environment for determining which end systems wish to transmit. What is also needed is a method and apparatus for scheduling transmissions from a group of end systems connected on a shared transmission channel. Finally, what is needed is a method and apparatus for preventing an end system that is not scheduled to transmit from transmitting.

SUMMARY OF THE INVENTION

In general terms, the present invention comprises techniques and devices for an improved computer network and methods and devices for the operation thereof. According to the invention, characteristics of prior art ethernet are used to control the flow of data and access to the network among a group of logically connected network segments and to reduce collisions. The invention determines which nodes wish to send data when a collision occurs by detecting and recording which nodes participated in a collision. A scheduling routine is designed to give each of the repeater's connected segments a chance to send. A transmission control mechanism is used to prevent a subset of transmitters from transmitting while allowing one ES to transmit without experiencing a collision.

According to the invention, different scheduling routines are possible, each having advantages in different applications. The goal of each scheduling routine is to appropriately and efficiently control which ES can next transmit a packet. Possible scheduling routines according to the invention are referred to herein as round-robin (RR), first-come/first-served (FCFS), and oldest packet first (OPF). Other scheduling schemes are compatible with the invention, including schemes that allow for packets or ports to have a higher priority than other packets and ports.

In addition to a method of scheduling, the invention is also provided with a way to hold-off the transmissions from all but one ES so that the ES according to the schedule can transmit without experiencing a collision. Alternative methods and variations of transmission control by a repeater according to the invention are described below.

According to an embodiment of the invention, collisions inform the repeater who has data to send, and then once the repeater knows who has data to send, a repeater allows each sender to send according to the schedule and without allowing any further collisions to occur among the initial colliders. In that way, the amount of time that the channel is quiet waiting for an ES to exit backoff is minimized, and overall network through-put is increased.

The invention has particular application in multi-media ethernet environment where a number of video streams are being transmitted over the LAN through a repeater. Some analysis and benchmarking of such an environment is described below.

Specific aspects of the invention will be better understood upon reference to the following detailed description and in conjunction with the drawings.

BRIEF DESCRIPTION OF THE DRAWINGS

FIG. 2 is a diagram illustrating a repeater connecting four transmitter/receivers to illustrate aspects of the invention;

FIG. 3 is a diagram of a prior art packet as an example of a type of data unit upon which the invention may be effectively employed;

FIG. 4 is a diagram illustrating a layered network protocol;

DETAILED DESCRIPTION OF SPECIFIC EMBODIMENTS

Figure 1:
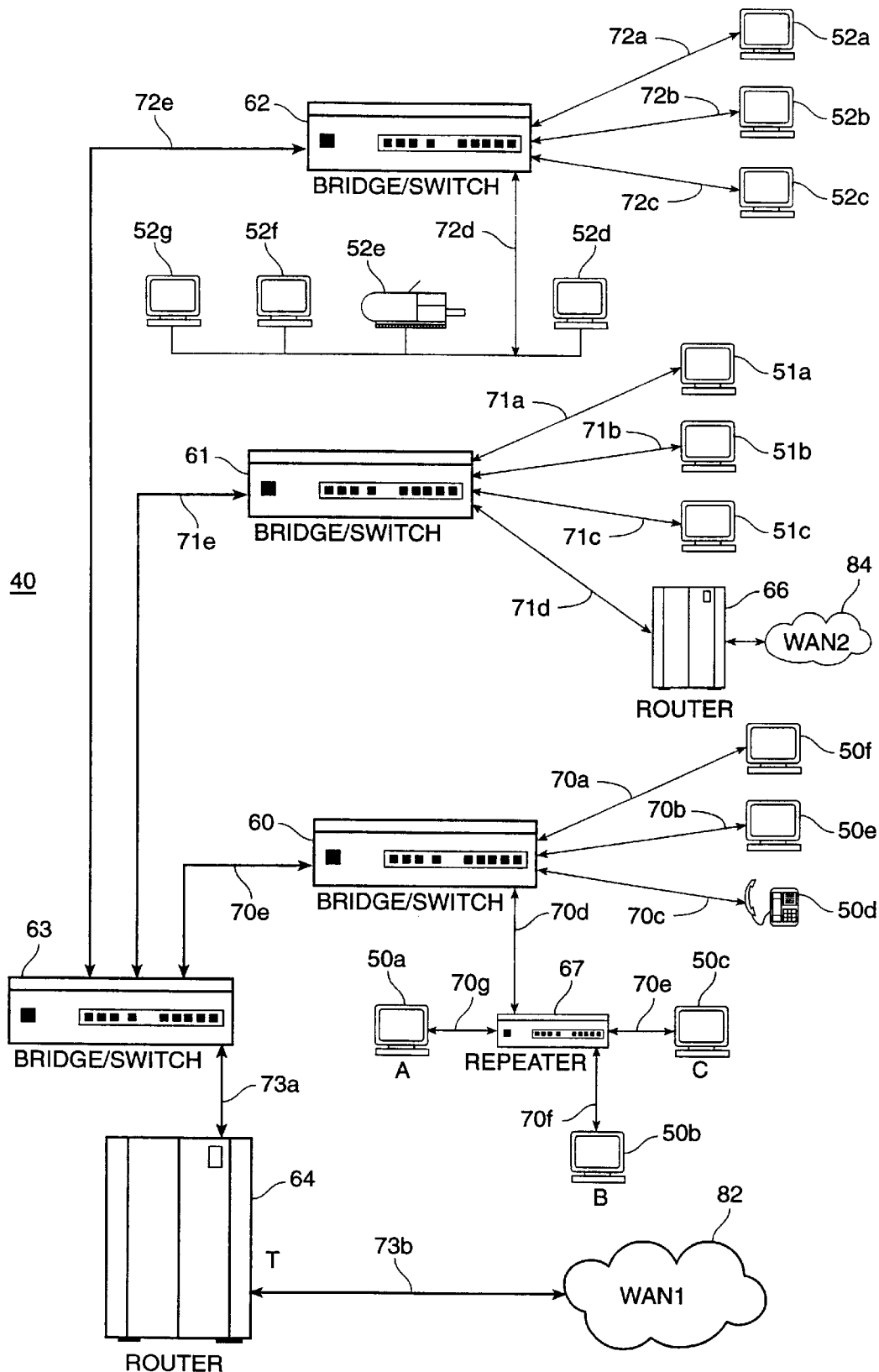
FIG. 1 is a diagram of a moderate sized network of one type in which the invention may be effectively employed.
Figure 5:
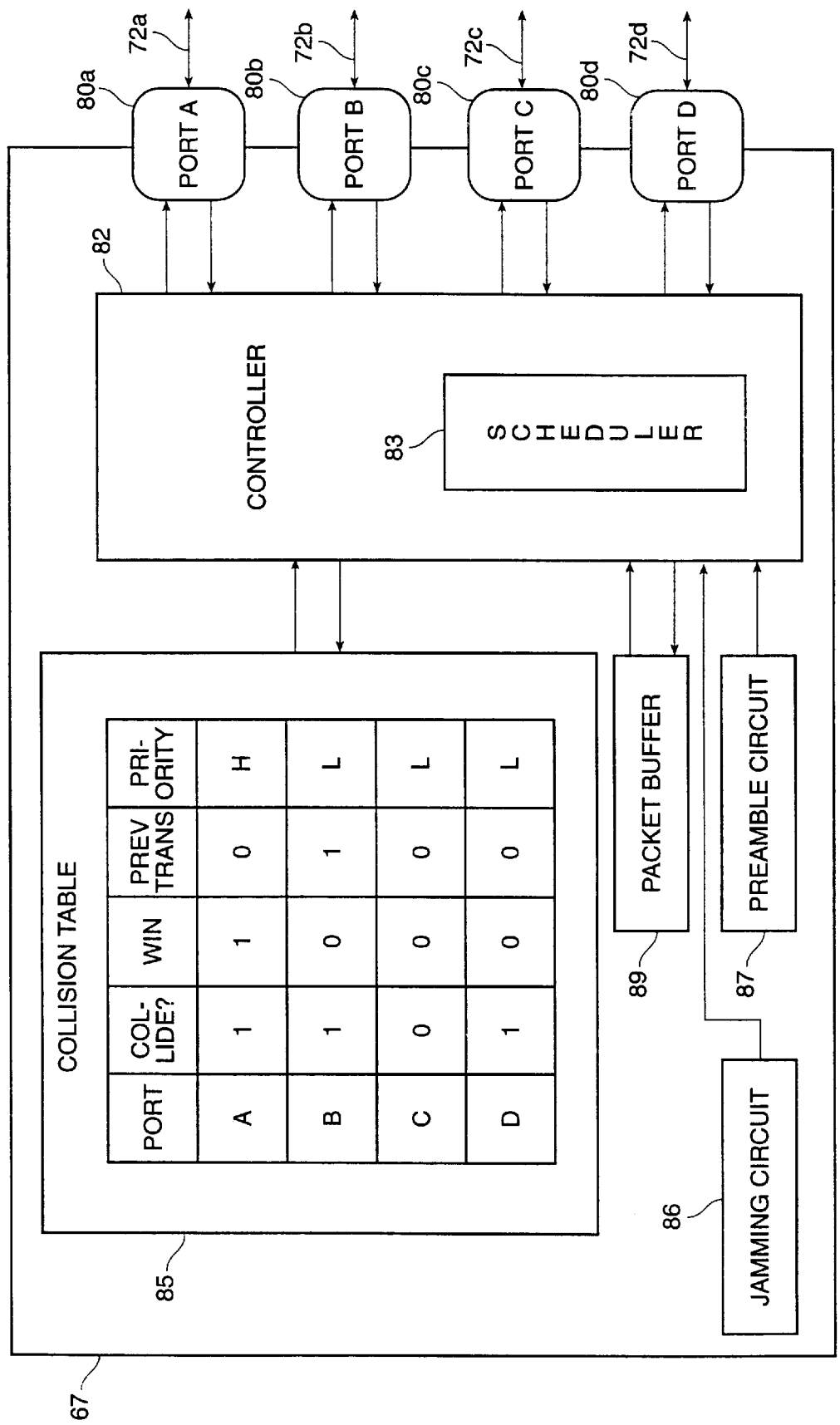
FIG. 5 is a block diagram of a repeater according to one specific embodiment of the invention.

FIG. 2 is a block diagram of a repeater connected to three ESs and one IS that will be used to illustrate the invention. FIG. 5 is a block diagram representing a repeater internal structure according to one embodiment of the invention. As discussed above, according to the various methods of the invention, collisions between multiple transmitters are detected, a schedule is determined for allowing one transmitter at a time to transmit, and a transmission control is used to prevent those ESs not selected for transmission from transmitting on the shared media. A repeater or other networking device according to the invention incorporates one or more of these capabilities to improve network throughput. Various specific techniques for accomplishing these capabilities are described in the context of the following alternative specific embodiments.

FIG. 5 represents one possible arrangement of one possible device 67 in which the invention may be employed. Shown in FIG. 5 are segments 72a–d, connected to ports 80a–d. Controller 82 controls flow of Tx/Rx data on the ports, detects collisions, and routes data to/from buffer 89 and routes signals from preamble circuit 87 and jamming circuit 86 as necessary and as determined by schedule routine 83. Collision table 85 is used to store data relating to collisions and scheduling at a port including which ports participated in a collision, which port won the collision, which port was the previously transmitting port, and a priority indication for a port if included in the invention. Not all elements shown will be present in all embodiments of the invention as described elsewhere herein and the invention may be used in repeaters that include other elements such as address tables for ports.

Figure 6:
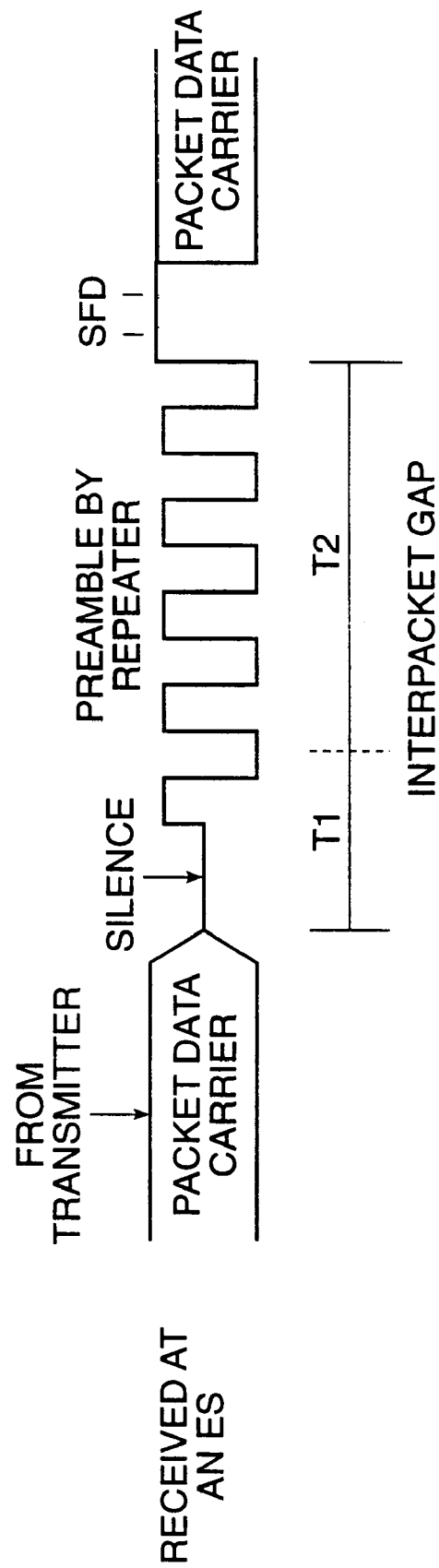
FIG. 6 is a timing diagram showing the relationship between the end of packet and the interpacket gap.

FIG. 6 is a timing diagram showing the relationship between the end of packet and the interpacket gap. As shown, the interpacket gap may be thought of as being divided into two time periods, a time period T1 and a time period T2. According to a standard ethernet protocol, any resumption of signal during a time period T1 will cause an adaptor waiting to transmit to continue to defer, whereas if a signal is not resumed until sometime into time period T2, a deferring transmitter will collide with that signal according to the standard ethernet protocol.

Collision Detection

Referring now to FIG. 2, as is known in the art, a collision is said to occur in FIG. 2 when a transmitter such as A attempts to transmit on its wire while or at the same time that transmission from another transmitter such as B is occurring. In standard ethernet, such a collision would occur on the shared channel itself, and all that would be known by the ESs that were attempting to transmit was that a collision occurred. There is no mechanism within standard ethernet for an end system to know which other end systems or how many other end systems were attempting to transmit and therefore caused the collision.

In a repeater such as 67, however, collisions from each port may be individually detected by the repeater while the repeater is repeating the colliding signal out of all the other ports. According to the invention, a repeater such as 67 is enabled to detect which specific ports caused a collision and for each collision the repeater stores that information in a collision table 85. According to the invention, the repeater may also store other transmission information in collision table 85, such as which node was the last node to successfully transmit a packet. Transmission through repeater 67 may occur without the scheduling or transmission control described herein until such time as a collision occurs, but once a collision occurs, according to the invention, further transmissions from the end system are controlled as described below.

Scheduling

According to the invention, a number of different scheduling schemes may be employed in order to determine which ES the repeater will next allow to send. These techniques may each have different fairness and efficiency characteristics and so be appropriate for different networking environments. The invention may also employ more than one technique, as described below, and may switch between techniques based on certain criteria.

Round-Robin Scheduling

One preferred embodiment will be referred to herein as round-robin (RR) scheduling and has some variations according to the invention. In RR scheduling, ES are allowed to send in a RR fashion (A,B,D,A,B,D) when they participate in a collision. In order to minimize jitter, the ESs may always be given a chance to send a packet in the same order.

In one embodiment, round-robin control is maintained just until each transmitter has a chance to send one packet. In an alternative embodiment of the invention, the repeater assumes that a transmitter will generally want to send more than one packet and will continue round-robin control, dropping repeaters from the round-robin when they no longer send packets of data when given the opportunity. In this way, the invention insures that a collision only occurs when a node is initially signalling to the repeater that is wishes to transmit data.

First Come/First Serve Protocol

An alternative to the RR scheduling method is a first come/first serve (FCFS) method. In testing, it has been found that in some ethernet environments FCFS works better for large packets while RR works better for very small packets, where very small packets are packets of less than about 100 bytes. This is so because in RR after a collision, repeater 67 selects a particular ES and waits for it to transmit. During the time that repeater 67 is waiting for B to transmit, nothing is being transmitted on the wire, so RR can be inefficient.

According to one aspect of the invention, because there is a single buffer 89 in the hub repeater, the repeater can decide, based on the packet size in its buffer, whether to use RR or FCFS. In one particular embodiment, FCFS is used for packets greater than 500 bytes because FCFS works better for large packets depending how far other collided ESs backed off. In other embodiments, the scheduling algorithm may be changed depending on other characteristics of the packet stored in the buffer, such as a particular protocol indication or priority indication in the packet. In a further embodiment, a scheduling algorithm may be changed based on experiencing a second collision after the initial scheduling routine is begun. In general, according to this embodiment, a different scheduling routine may be selected based on a repeaters view of network traffic. In the FCFS algorithm, an ES that just previously transmitted a packet may be excluded from the FCFS determination.

In one embodiment of the FCFS algorithm, a repeater according to the invention behaves as follows. When three transmitters, such as A, B and C, each attempt to transmit at the same time, according to this aspect of the invention all three of the transmitters will detect a collision and all three will enter back off. Rather than selecting a particular node to transmit, in FCFS the repeater 67 waits for the first node to attempt a retransmission and allows that first packet to go through without allowing a collision. As soon as that first packet goes through, other packets are allowed to go through from other transmitters in either an ongoing FCFS order or in a RR fashion. Note that if the packet being retransmitted is large, during the time that packet is transmitted the other nodes will have exited their back off routine and will be waiting in deferral to immediately transmit a packet as soon as they detect silence on the channel. If the repeater had started in a round-robin fashion, by contrast, the channel would sit and wait until that particular selected transmitter exited its random back off and attempted to retransmit its packet.

Other Scheduling Variations

According to the invention, a repeater may also determine scheduling based on other criteria such as an a prior assignment of particular priorities to particular ports or determining who gets to transmit first based on a bit seen in the initial header of a packet.

In further embodiments, a repeater may arbitrate among ESs with a consideration for priorities or other indications, assigning a higher priority to specific traffic in the round-robin scheme. In a specific case, this filtering could include assigning a priority to individual packets. According to a specific embodiment, an adaptor driver assigns one of two priorities: a high priority (HP) or a low priority (LP). With the assignment of priority, a repeater according to the present invention can manage and determine in what order packets are passed such that high priority packets are transmitted on the network before low priority packets are transmitted on the network.

In a different embodiment, the invention may be used in conjunction with other modified network software and hardware to achieve further enhancements in performance. These other modified network elements could include network switching devices that recognize a priority field set by an adaptor driver according to the invention and that provide special handling for high priority packets.

Controlling Transmission

According to the invention, once a repeater such as 67 has determined an appropriate schedule for allowing transmitters to transmit a packet, the repeater uses a mechanism to control which attached ESs transmit in order to achieve the desired schedule. In a preferred embodiment, the transmission control is such that once a transmitter has exited back off and is in deferral awaiting transmission of a packet, it is kept in deferral until it is given an opportunity to transmit or until a collision is caused by another transmitter that did not participate in the original transmission. In a specific embodiment, the invention uses a unique manipulation of the interpacket gap (IPG) to hold ESs wishing to transmit in deferral until such time as the ES is granted access to the shared channel.

Use of the Inter-Packet Gap (IPG)

One method of controlling access to the network according to the invention is to rely on the fact that prior art ethernet defines an inter-packet gap (IPG) between transmitted packets as illustrated in FIG. 6. This aspect of the invention in some embodiments involves ES detection of silence, carrier, and preamble. Carrier is generally the presence of energy on a connection. Silence is the absence of carrier. Preamble is a particular repeating digital signal such as 1010, followed by the starting frame delimiter (SFD) of the particular protocol, which in standard ethernet is 11. In prior art ethernet, preamble is used by a transmitter to signal that a packet is about to be transmitted on the channel.

In prior art ethernet, an ES generally will not collide with a packet that is transmitting, it will wait (or defer) until it detects silence (in other words, it will wait for IPG) but it will then transmit even if another ES has started transmitting at nearly the same time.

Within the prior art ethernet defined IPG there is a mechanism left over from co-axial ethernet wherein if, during the first part of the IPG, carrier is resumed, an ES will not collide with the new signal, even if the ES detected the end of the previous packet. Essentially the ES considers that the resumed carrier is part of the previous packet even though the ES has detected the end of the previous packet. The ES therefore remains in deferral. After that initial window during the IPG, however, an ES will collide with a signal even if carrier is detected when the ES begins transmitting.

In order to minimize retransmission delay, the invention sends preamble code immediately after the end of a packet to all but one of the ESs that want to send. This preamble, according to the invention, is sent quickly enough during the beginning of an IPG so that all the ESs receiving it remain in deferral.

As an example, a repeater 67 according to the invention, when it determines it is A's turn to send, even though it knows B, D also wants to send will go quiet on A and start sending preamble to B, and D quickly enough so that B and D remain in deferral and do not collide with the transmitted signal from A. That way B and D never detect a second collision and never re-initiate their backoff counters. When it is B's turn to transmit, the repeater goes silent on B and B will transmit immediately because it is in deferral, without waiting a backoff time and without experiencing another collision.

Therefore a repeater transmitting to B will drop carrier at the end of a packet transmitted from A so that B will see the end of the packet, but before B can exit deferral mode, the repeater will begin transmitting preamble so that B never collides with the new signal from A and so that B never leaves deferral until it is B's turn to transmit.

A further aspect of the invention is that the only nodes that are held in deferral using a preamble are those that have previously tried to send and participated in a collision. ESs not being held in deferral will transmit (and therefore cause a collision) during the next IPG, thereby alerting the repeater that they have data to send.

According to one embodiment of the invention, an improved repeater according to the invention may be implemented entirely in software or hardware instructions installed in the repeater and without modifying ES adaptors.

Use of Collisions

As another alternative for transmission control, a repeater according to the invention may simply collide with packets during a second part of the interpacket gap or without regard for the interpacket gap on nodes that are not selected for transmission. While this may, in some applications, be less efficient than the alternative just described, the invention will otherwise work as described and will provide the scheduling advantages.

Multimedia Ethernet Application

Figure 7:
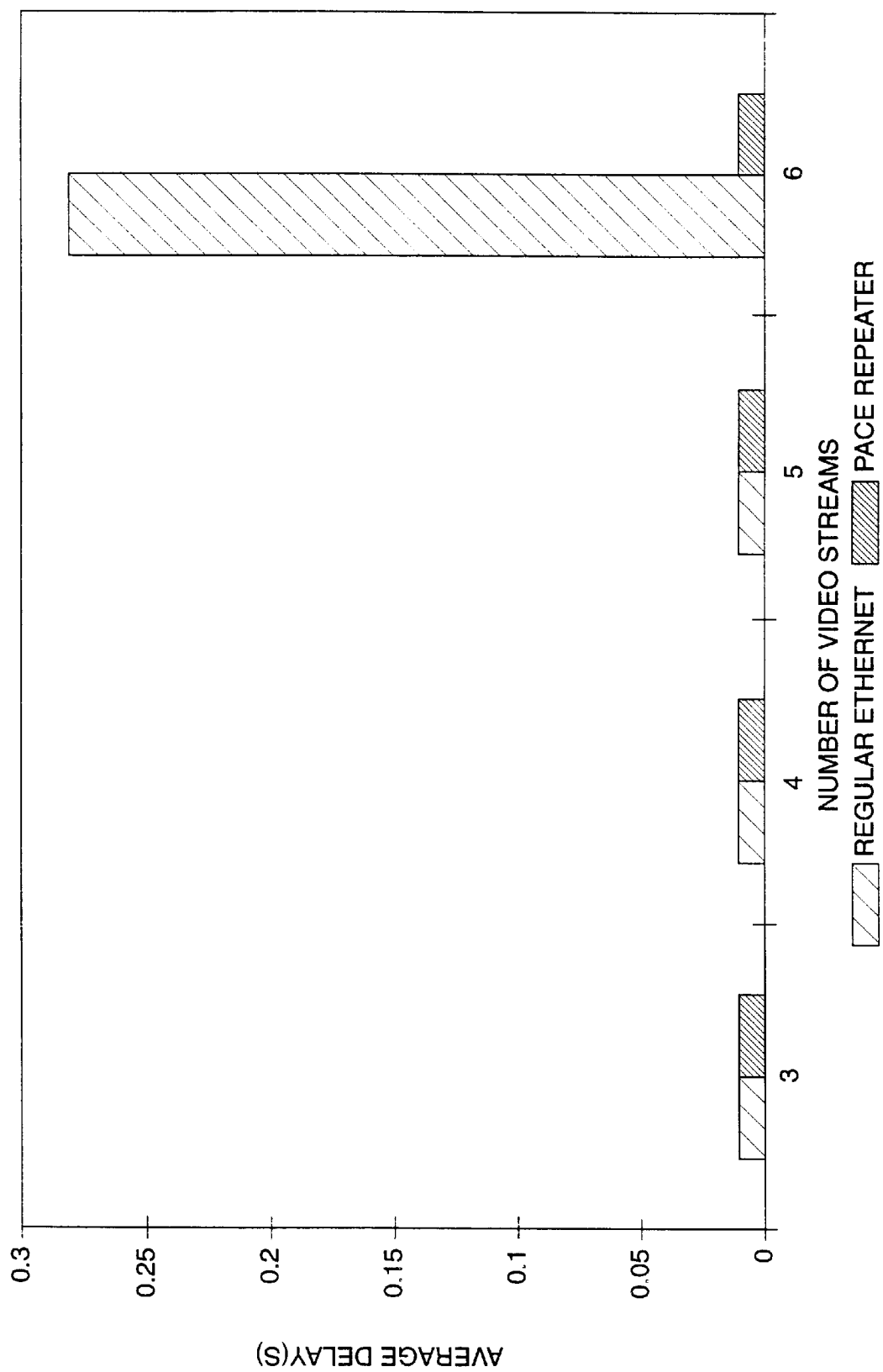
FIG. 7 is a comparison of the average delay for 3 to 6 video streams over 10 Mb/s ethernet between a regular ethernet repeater and a repeater according to the invention.
Figure 8:
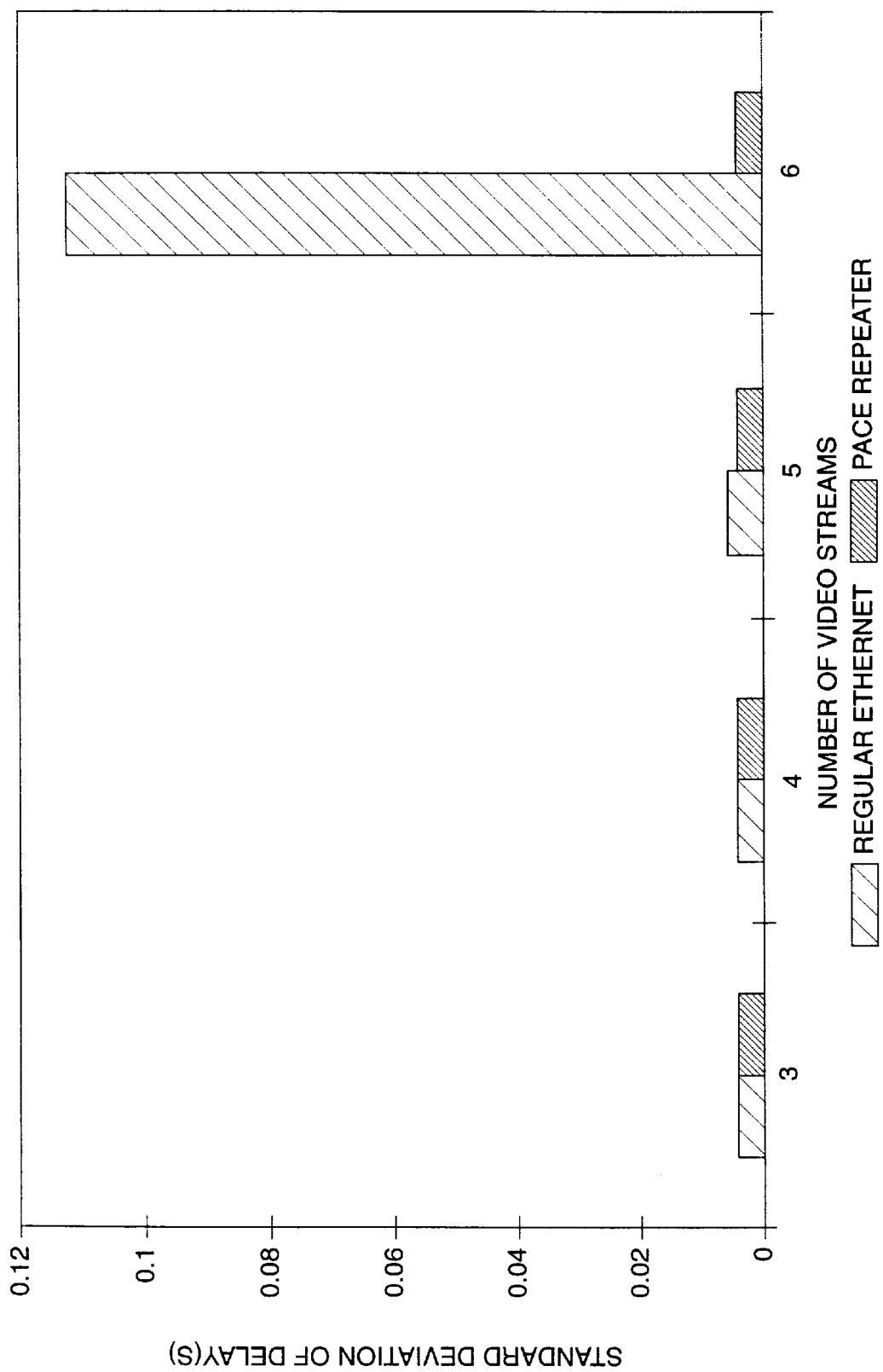
FIG. 8 is a comparison of the standard deviation of delay of the scenario of FIG. 7.
Figure 9:
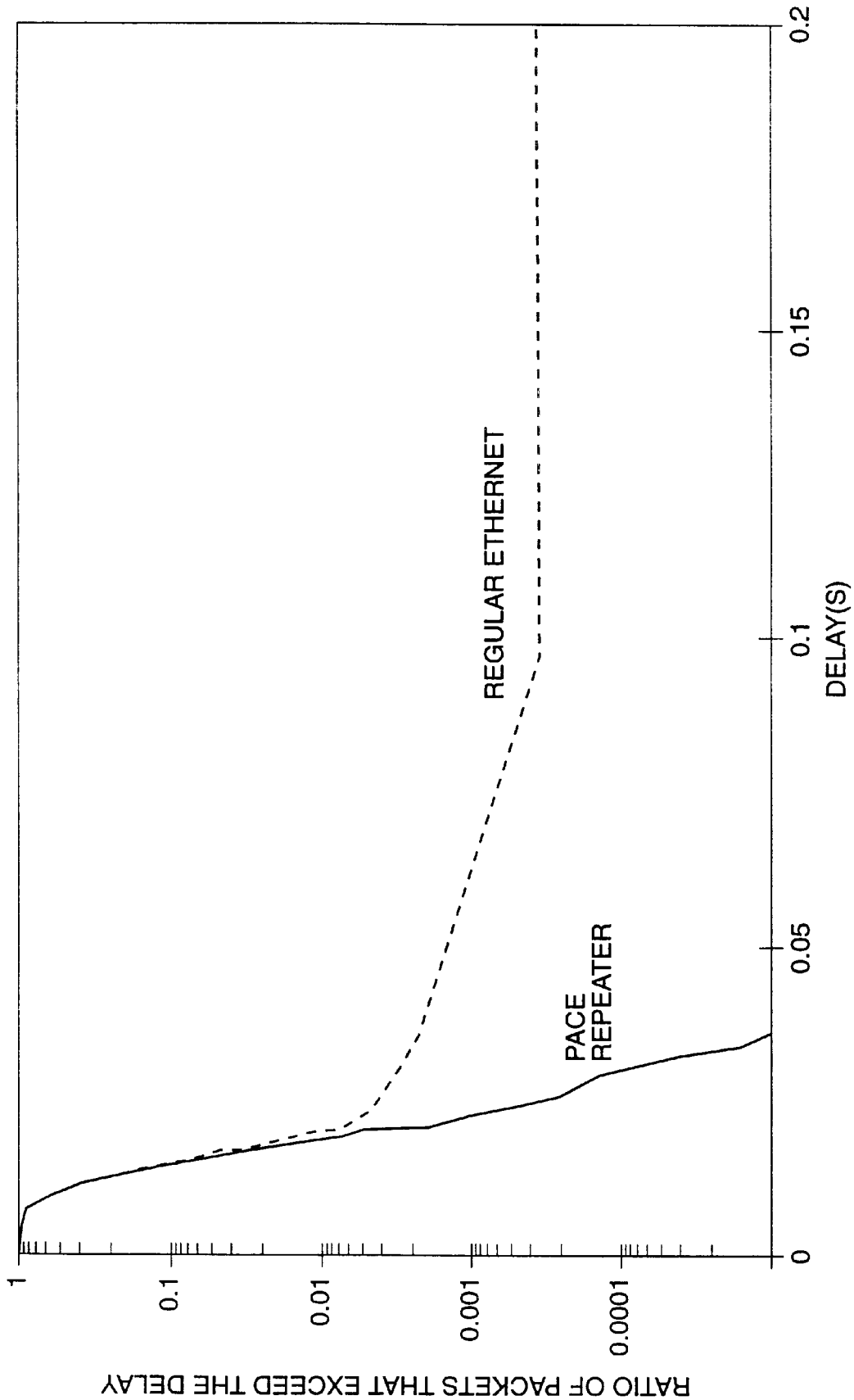
FIG. 9 shows the delay distribution of the scenario of FIG. 7.

One particular application for the invention is in an ethernet network that includes video traffic. FIGS. 7 through 17 provide various information comparing the present invention with a standard ethernet repeater not incorporating the present invention, using a number of different video stream traffic simulations. These simulations assume a network traffic that consists of video only with each sending ES generating one video stream, the video streams consisting of one minute of video in H.261 CBR encoded at 1.536 Mb/s with full sized ethernet packets. FIGS. 7, 8 and 9 show a comparison between a prior art repeater and a repeater according to the invention (designated PACE) where the invention is using an FCFS protocol.

As can be seen from FIGS. 7 and 8, the invention provides superior performance in terms of both average delay and standard deviation of delay when six video streams are transmitted on a 10 Mb/s ethernet. Note that six video streams represents 9.216 Mb/s, more than 92% of maximum capacity of the network connection. FIG. 9 shows that even with five video streams, a repeater according to the invention provides superior performance in that no packets ever exceed some minimum delay of about 0.03 seconds whereas in the prior art ethernet some packets are always lost when five video streams are transmitted.

Figure 10:
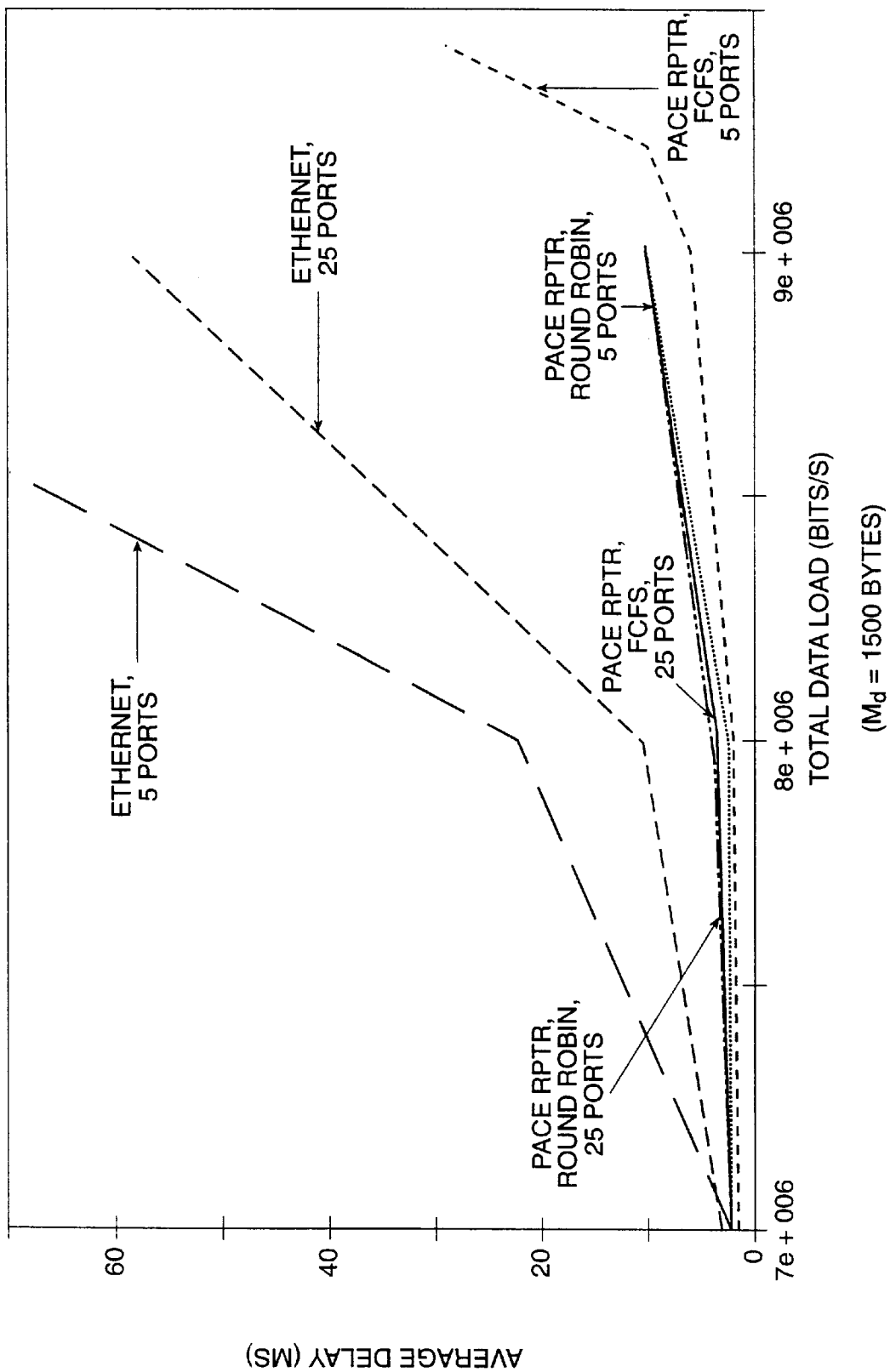
FIG. 10 shows the average delay versus the data load comparisons between a prior art ethernet repeater, a repeater according to the invention using round-robin scheduling, a repeater according to the invention using first-come/first-served scheduling for both five ports and for 25 ports.
Figure 11:
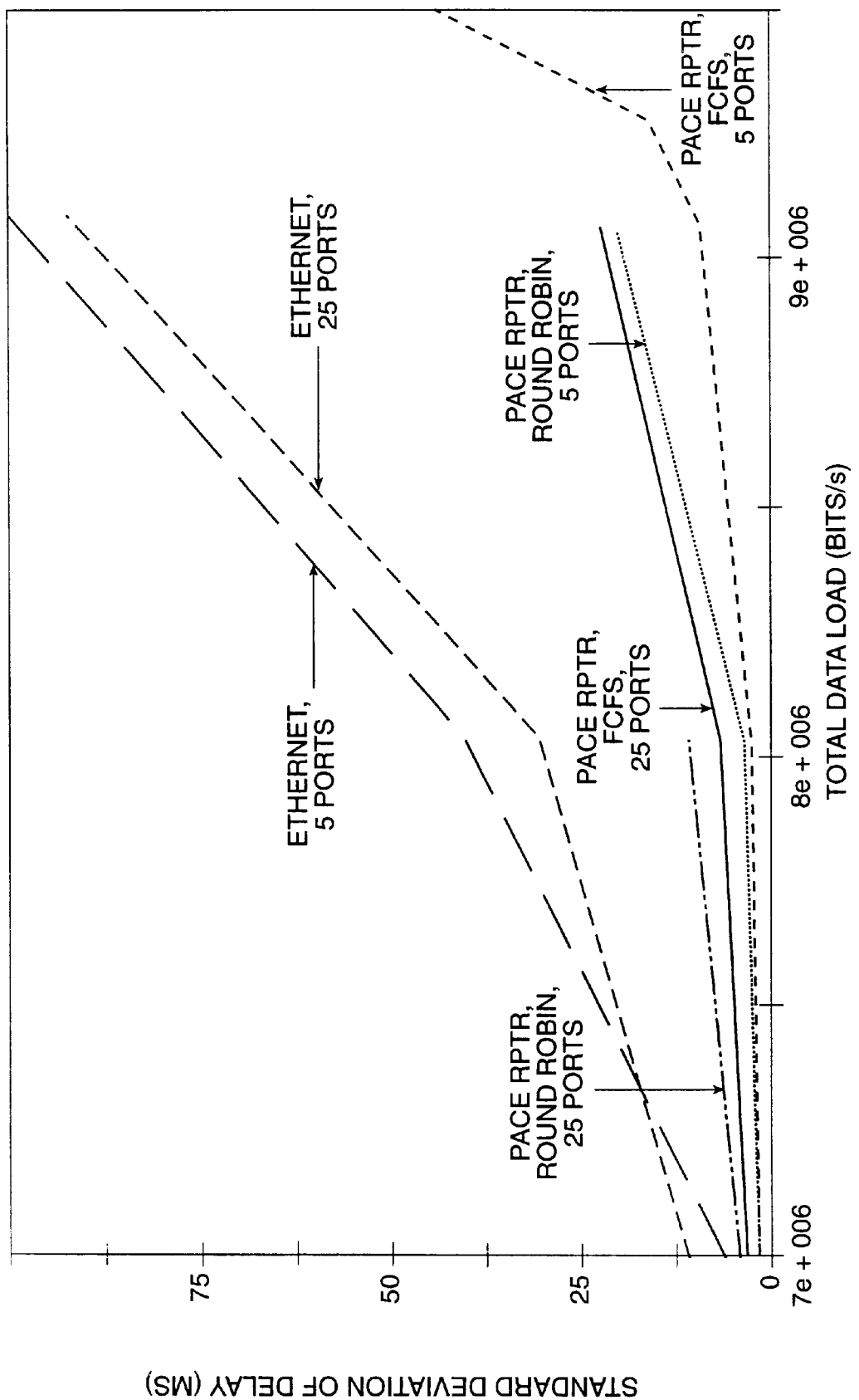
FIG. 11 is a comparison of the standard deviation of delay of the scenario of FIG. 10.
Figure 12:
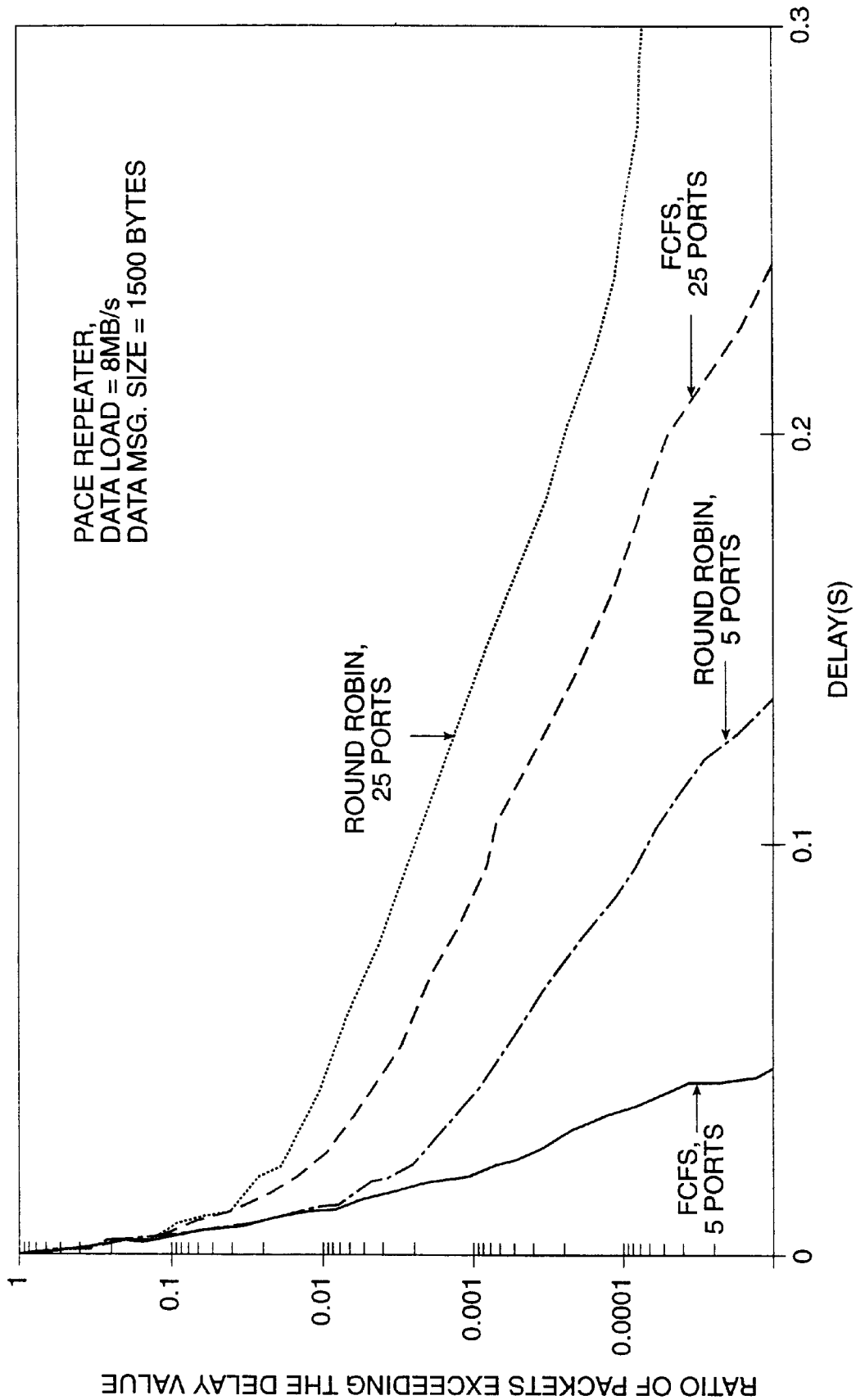
FIG. 12 shows the delay distribution of the scenarios showed in FIG. 10.

FIGS. 10, 11 and 12 show similar simulations for more complicated ports and packet traffic configurations. Again in a 10 Mb/s ethernet network and with repeaters having both five and 25 ports, a simple two parameter data traffic model was used for the simulations having fixed sized messages of $M_d$ bites and a uniformly distributed message interarrival times. Note from the figures that the repeater according to the invention provided increasing superior performance as the data loads got above 90% of the maximum data capacity of the channel.

Figure 13:
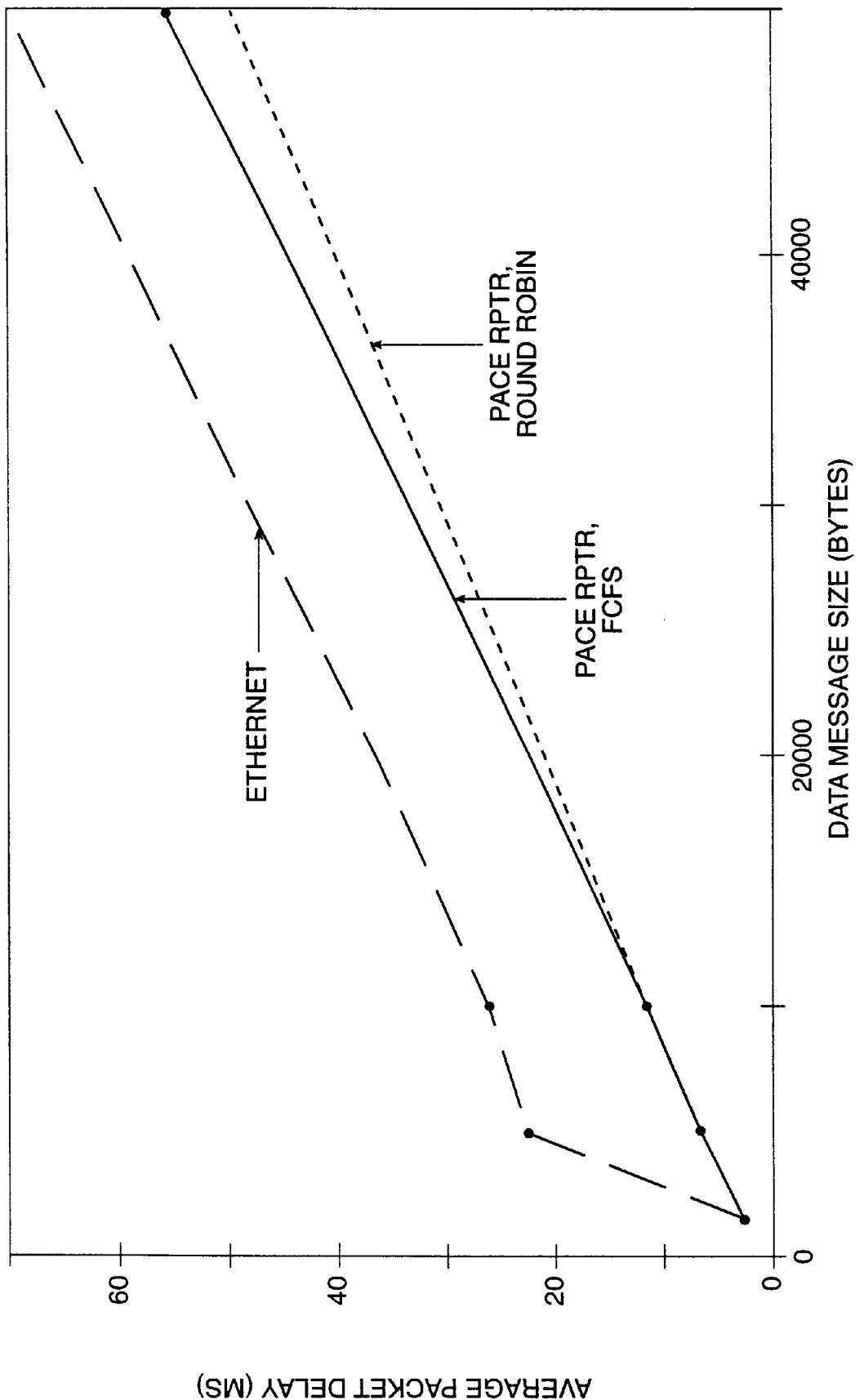
FIG. 13 shows a comparison of average delay versus the burst size in a prior art ethernet repeater, a repeater according to the invention using round-robin scheduling, a repeater according to the invention using first-come/first-served scheduling.
Figure 14:
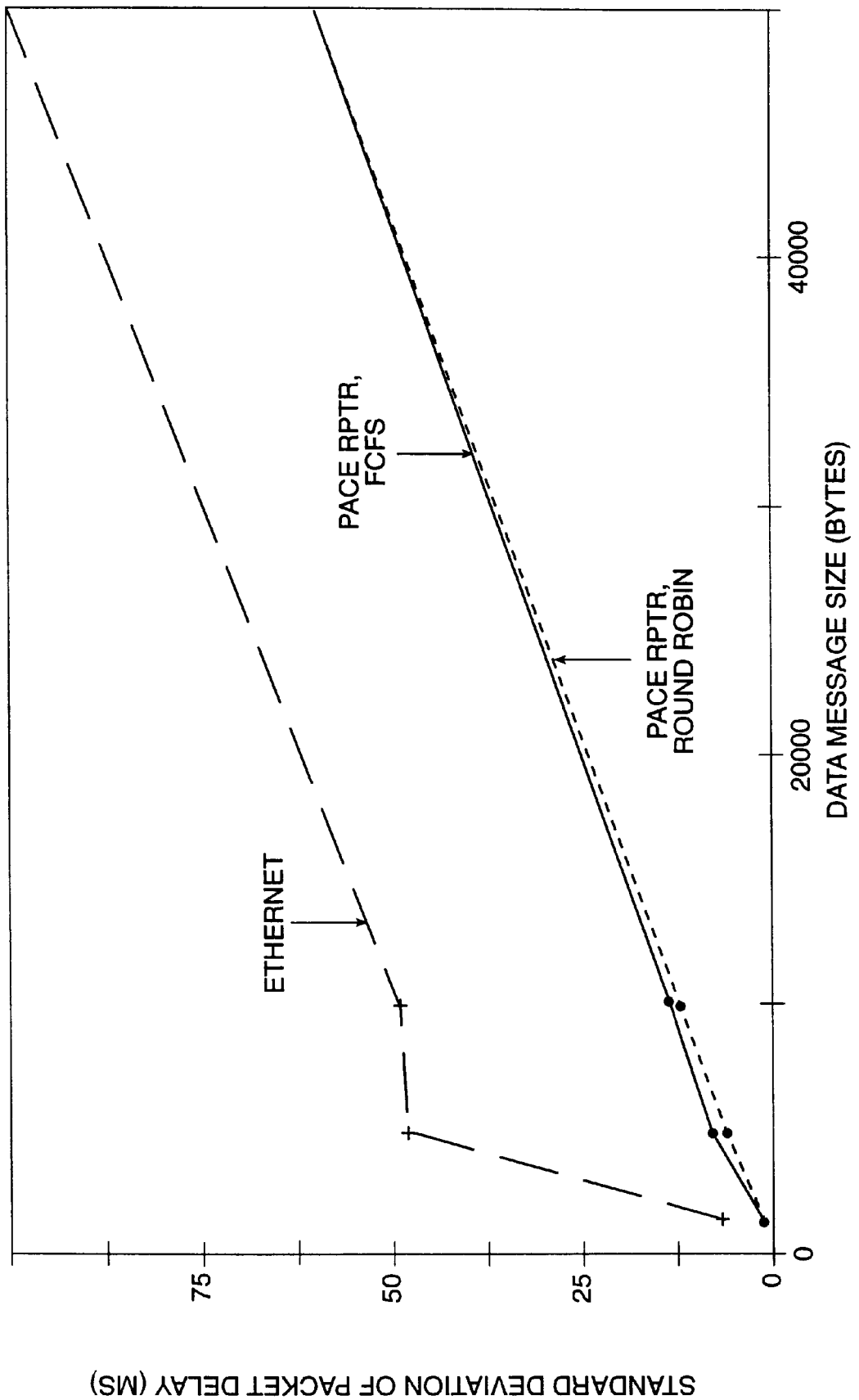
FIG. 14 shows standard deviation of average delay related to FIG. 13.
Figure 15:
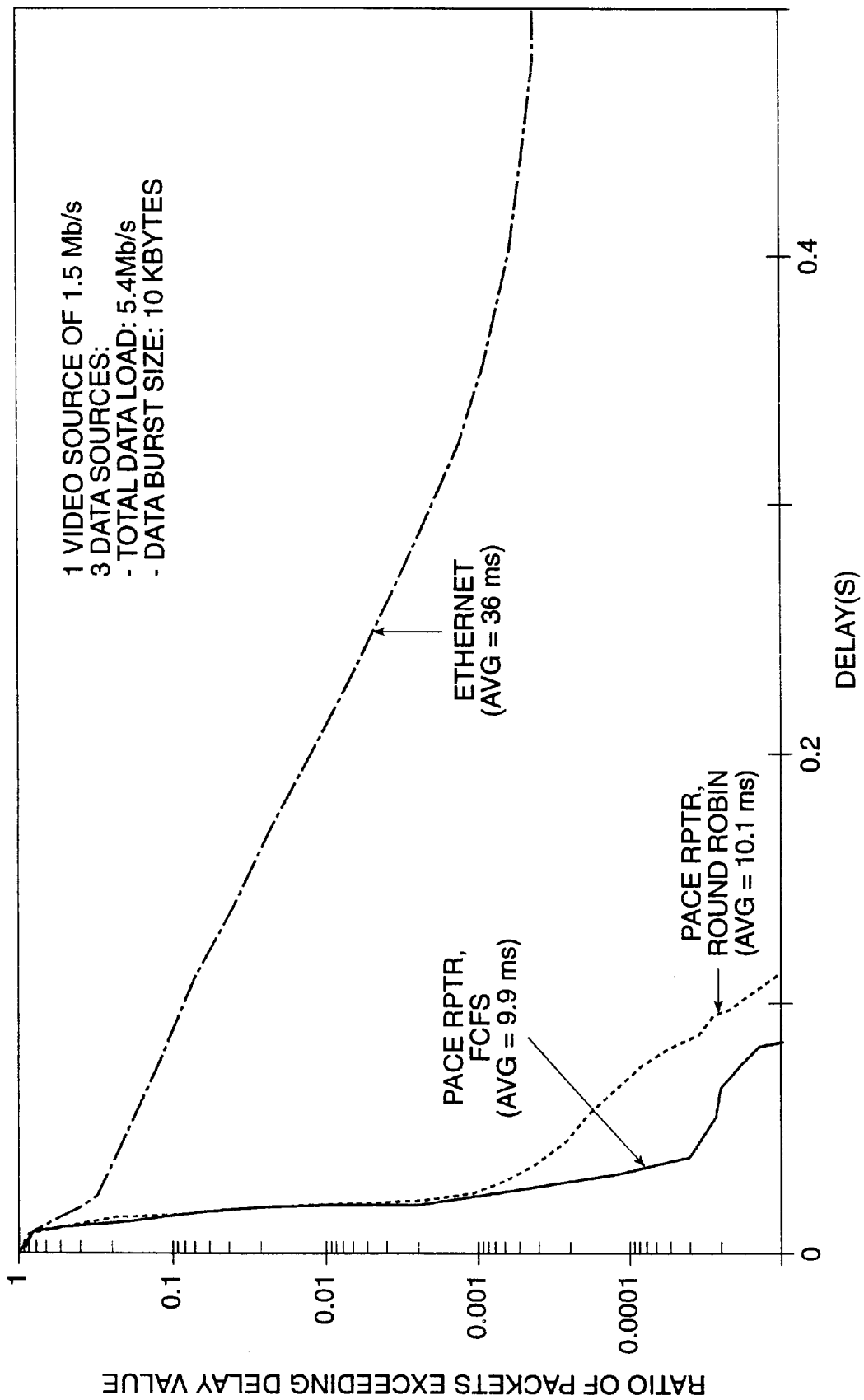
FIG. 15 shows delay distribution related to FIG. 13.

Other simulations have shown similar performance benefits for bursty data traffic, represented in FIGS. 13, 14 and 15.

Figure 16:
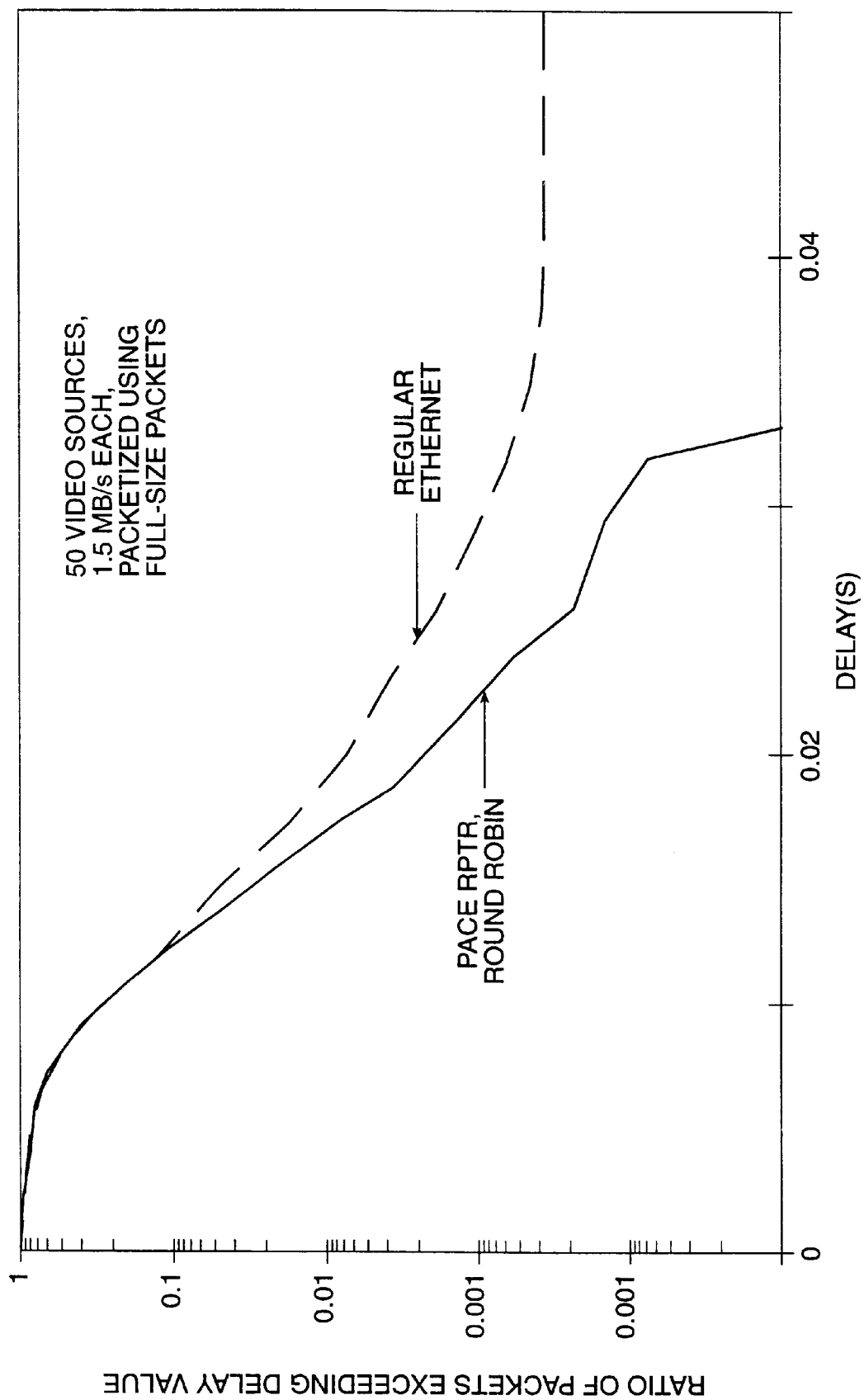
FIG. 16 shows a comparison of packets exceeding the delay value for regular ethernet versus a round-robin scheduling algorithm according to the invention for 50 video sources over 100 megabit per second ethernet.
Figure 17:
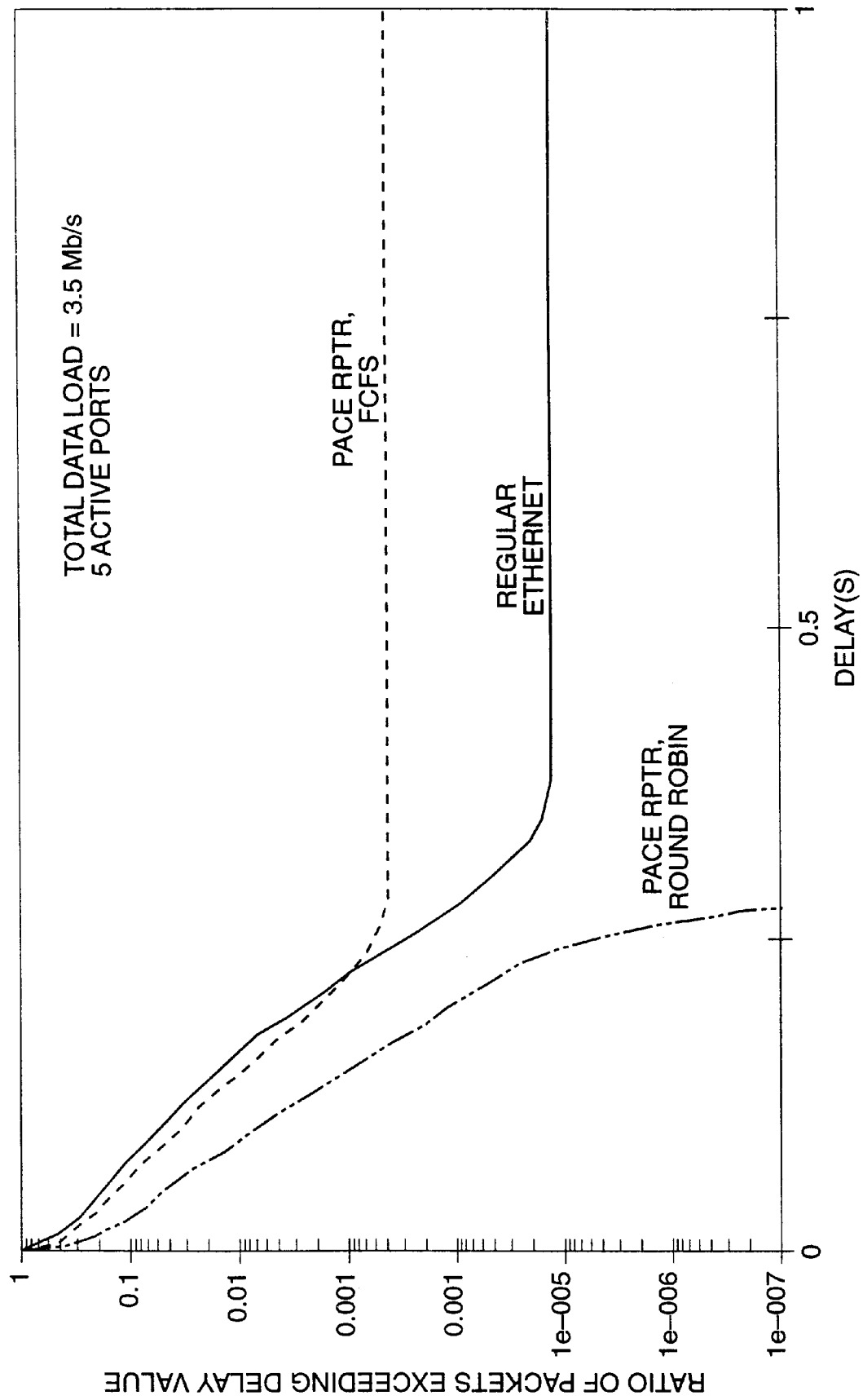
FIG. 17 shows results of a benchmark test with small packets comparing two different scheduling schemes according to the invention with regular ethernet.

FIG. 16 shows performance comparison for 100 Mb/s ethernet with 50 video streams. FIG. 17 shows results of a benchmark test with small packets comparing two different scheduling schemes according to the invention with regular ethernet.

Figure 18:
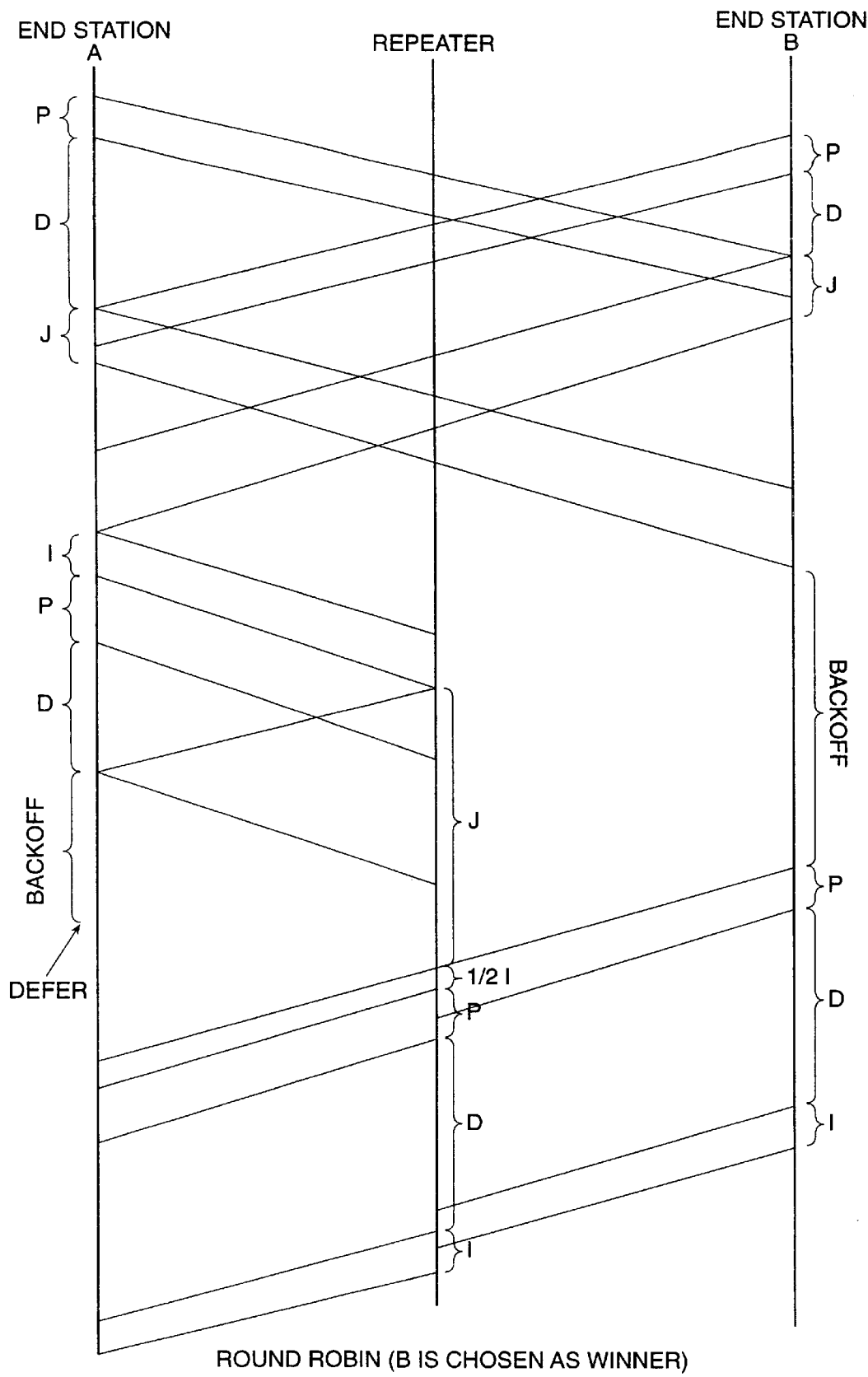
FIG. 18 is a time space diagram of the behavior of a node A, a node B and a repeater according to one specific embodiment of the invention and utilizing a round-robin scheduling scheme.
Figure 19:
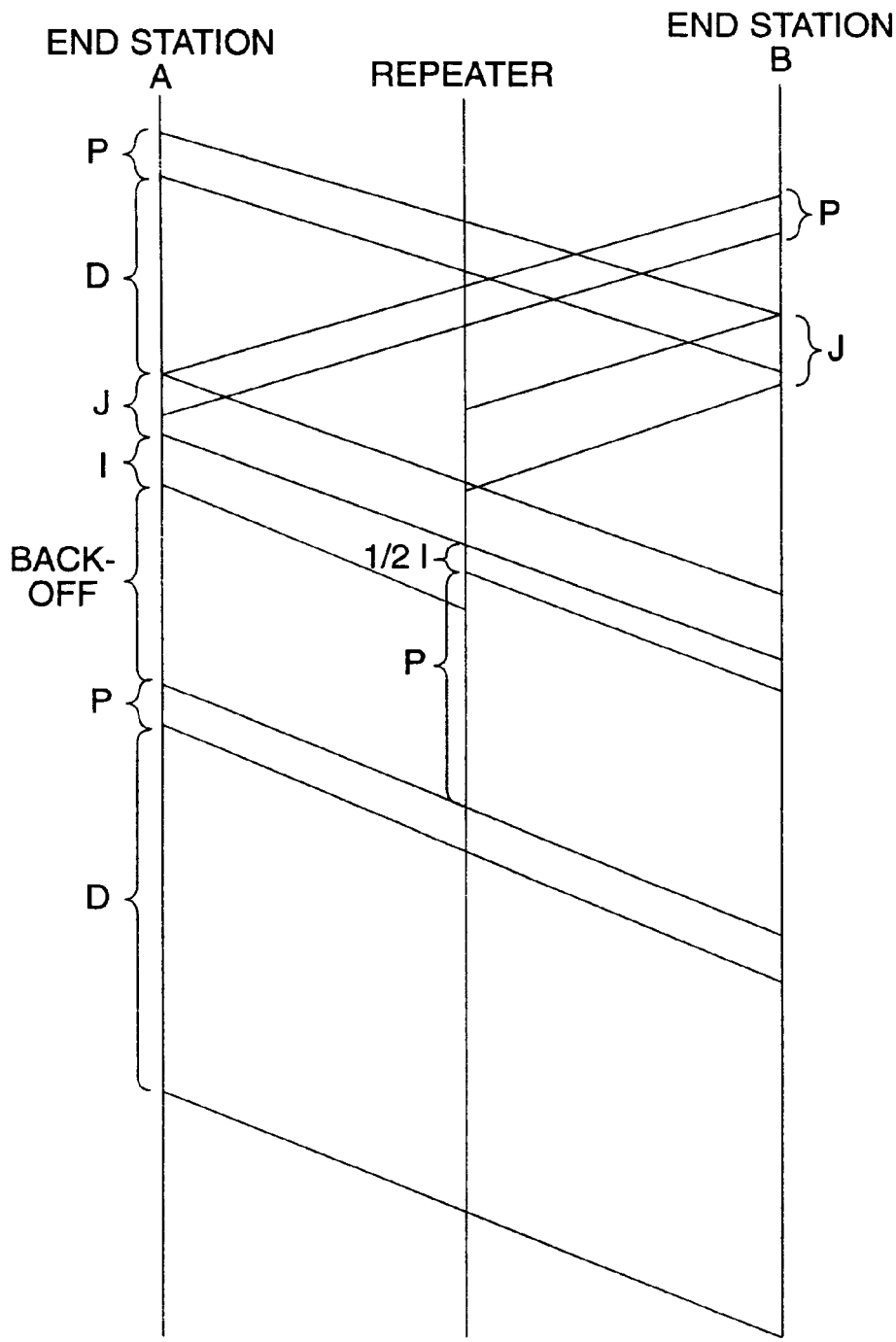
FIG. 19 is a time space diagram of the behavior of node A, a node B and a repeater according to one specific embodiment of the invention and utilizing a first come/first served scheduling scheme.

FIGS. 18 and 19 are time space diagrams showing the generation and reception of events in a network comprising a repeater represented by the middle vertical line and a node A represented by the left vertical line and a node B represented by the right vertical line. In the diagram, time flows down and events are begun near the top of the page and then propagate down and either left or right to the receiver of the event.

Figure 20:
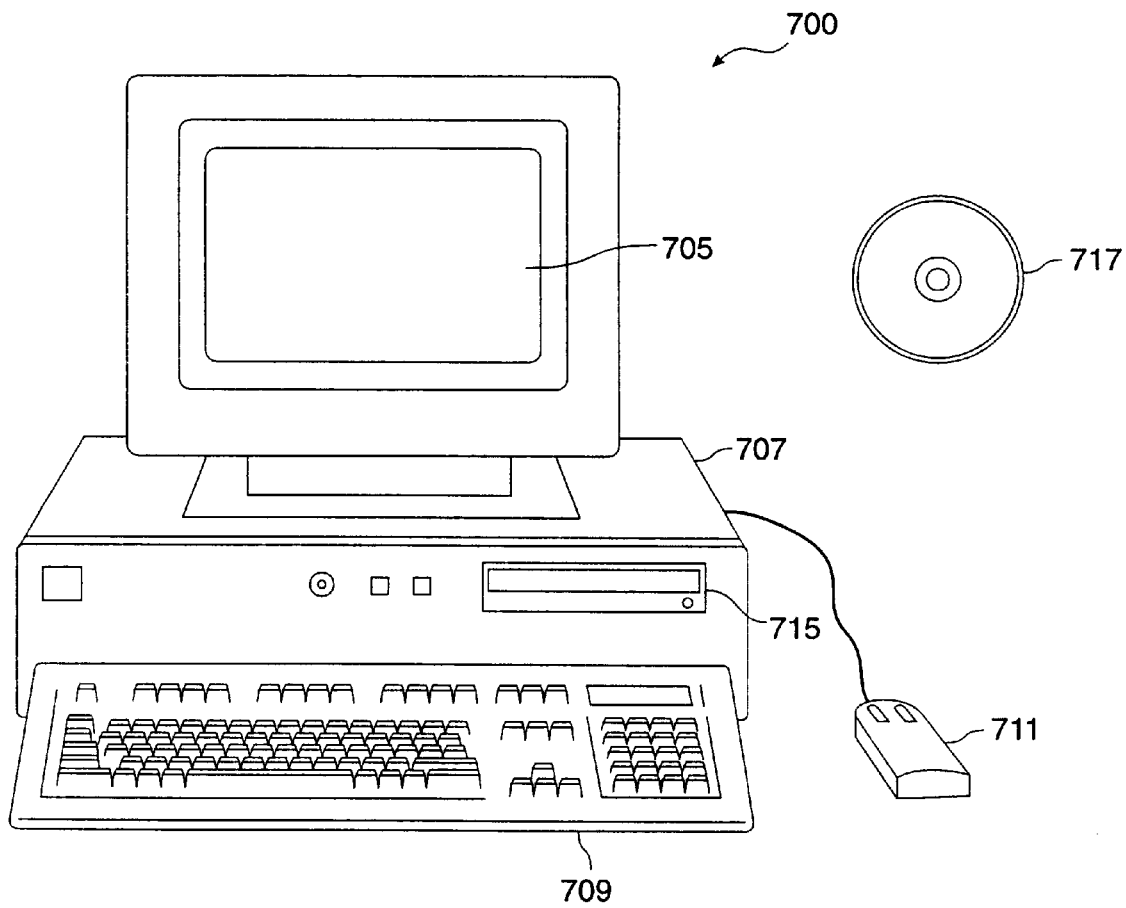
FIG. 20 is a diagram of a computer system with a fixed medium 717 which may be used to implement one embodiment of the invention.

The invention may be embodied in a set of executable computer program code which may be stored into a fixed computer medium such as a disk, diskette, volatile memory or non-volatile memory, or any other medium for storing computer code. In such a case when such instructions are loaded and executed in an appropriately configured network intermediate system, the intermediate system will perform as described herein. A representation of such a system 700 in shown in FIG. 20, containing CPU 707, optional input devices 709 and 711, disk drives 715 and optional monitor 705. Fixed media 717 may be used to program such a system and could represent a disk-type optical or magnetic media or a memory.

The invention also may be embodied within the circuitry of an application specific integrated circuit (ASIC). In such a case, the invention may be embodied in a computer understandable descriptor language which may be used by an ASIC foundry to create an ASIC device that operates as herein described. In this embodiment, computer system 700 may be understood as a computer system for reading instructions from media 717 for the manufacturing of an ASIC.

The invention has now been explained with reference to some specific embodiments. Other embodiments will be obvious to those with skill in the art. In particular the invention has application in many different networking environments and schemes. It is therefore intended that the invention not be limited except as indicated in the attached claims.

What is claimed is:

1. In a shared network environment, a method for transferring data among nodes connected via said shared environment comprising the steps of:

allowing a plurality of nodes to attempt to transmit on the network;

when a collision occurs, detecting which nodes are colliding nodes;

selecting one of said colliding nodes to transmit and going silent on said one selected node while transmitting a signal to non-selected nodes to prevent further transmission from said non-selected nodes during an early part of an inter-packet gap so as to hold said non-selected nodes in a ready-to-transmit state whereby a non-selected node will transmit data immediately when it detects silence;

allowing said one selected node to transmit an amount of data;

when said one selected node is finished transmitting said amount of data, allowing all nodes to hear silence long enough so that said nodes detect an end of transmission and then transmitting a signal to prevent transmission to all but a second selected node, so that all but a second selected node remain in a deferral mode.

2. The method according to claim 1 further comprising the step of:

allowing a signal transmitted by a node that is not a selected node and was not a colliding node to cause a second collision on said shared network.

3. The method according to claim 1 further comprising:

continuing to select nodes to transmit in a round-robin fashion while holding non-selected nodes that have participated in a collision in deferral using a transmitted signal.

4. The method according to claim 3 wherein said nodes are always selected in the same round-robin order so as to minimize jitter.

5. The method according to claim 1 wherein said nodes are selected in part based on a priority indication in a data unit transmitted on said nodes.

6. The method according to claim 1 wherein said nodes are selected in part based on a priority indication associated with a node.

7. The method according to claim 1 wherein state is maintained so that a node that transmits is not allowed to transmit again until all other nodes that participated in a collision have an opportunity to transmit.

8. The method according to claim 1 wherein an amount of data that a selected node is allowed to transmit before another node is allowed to transmit consists of a single packet.

9. The method according to claim 1 wherein an amount of data that a selected node is allowed to transmit before another node is allowed to transmit consists of more than one packet.

10. The method according to claim 1 wherein an amount of data that a selected node is allowed to transmit before another node is determined by a time slot.

11. The method according to claim 1 wherein after a collision occurs a node is selected based on a first node to attempt a transmission.

12. A fixed computer readable medium containing computer program code that when loaded into an appropriately configured computer system and run will cause the computer to perform the method of claim 1.

13. A fixed computer readable medium containing computer interpretable instructions describing a circuit layout for an integrated circuit that, when constructed according to said descriptions and placed into an appropriately configured computer system, will cause the computer to perform the method of claim 1.

14. A network intermediate system for connecting a plurality of nodes operating according to a shared CS/CD protocol comprising:
 a plurality of ports for transmitting/receiving data with said nodes;
 a collision table for remembering which ports experienced collision; and
 a controller operatively connected to said ports and said table and capable of:
  detecting a collision,
  determining and storing information regarding which ports participated in the collision,
  selecting a port for transmission, and
  preventing transmission from ports not selected for transmission by transmitting a signal to said not selected nodes during an early part of an inter-packet gap so as to hold said not selected nodes in a ready-to-transmit state whereby a not selected node will transmit data immediately when it detects silence.

15. The device according to claim 14 wherein state is maintained so that a node that transmits is not allowed to transmit again until all other nodes have an opportunity to transmit.

16. The device according to claim 14 further comprising a data buffer for storing a unit of data received on a port prior to transmitting that packet out of all other ports.

17. The device according to claim 14 further comprising a preamble generating circuit, simultaneously routable to a plurality of ports, for holding said ports in deferral.

18. The device according to claim 14 further comprising a jamming circuit routable to one port, for jamming transmission on said port.

19. The method according to claim 1 wherein said transmitting a signal to non-selected nodes to prevent further transmission from said non-selected nodes comprises transmitting a signal that forces a collision on said non-selected nodes while allowing said selected node to transmit.

20. The method according to claim 1 further comprising:
 storing a portion of said amount of data in a buffer before forwarding said data to said nodes; and
 selecting an algorithm for selecting a next node to transmit based on characteristics derived from said stored portion.

21. The method according to claim 20 further comprising:
 storing a portion of said amount of data in a buffer before forwarding said data to said nodes; and
 selecting an algorithm for selecting a next node to transmit based on characteristics derived from said stored portion.

22. The method according to claim 1 wherein when a collision occurs, a first transmitting node is a selected node and is allowed to complete its transmission without experiencing a collision while a collision is transmitted to other nodes that attempt transmission.

* * * * *